July 8, 1969
J. KERR
3,454,354
REMOVAL OF SULFUR DIOXIDE FROM FLUE GAS
Filed April 5, 1966
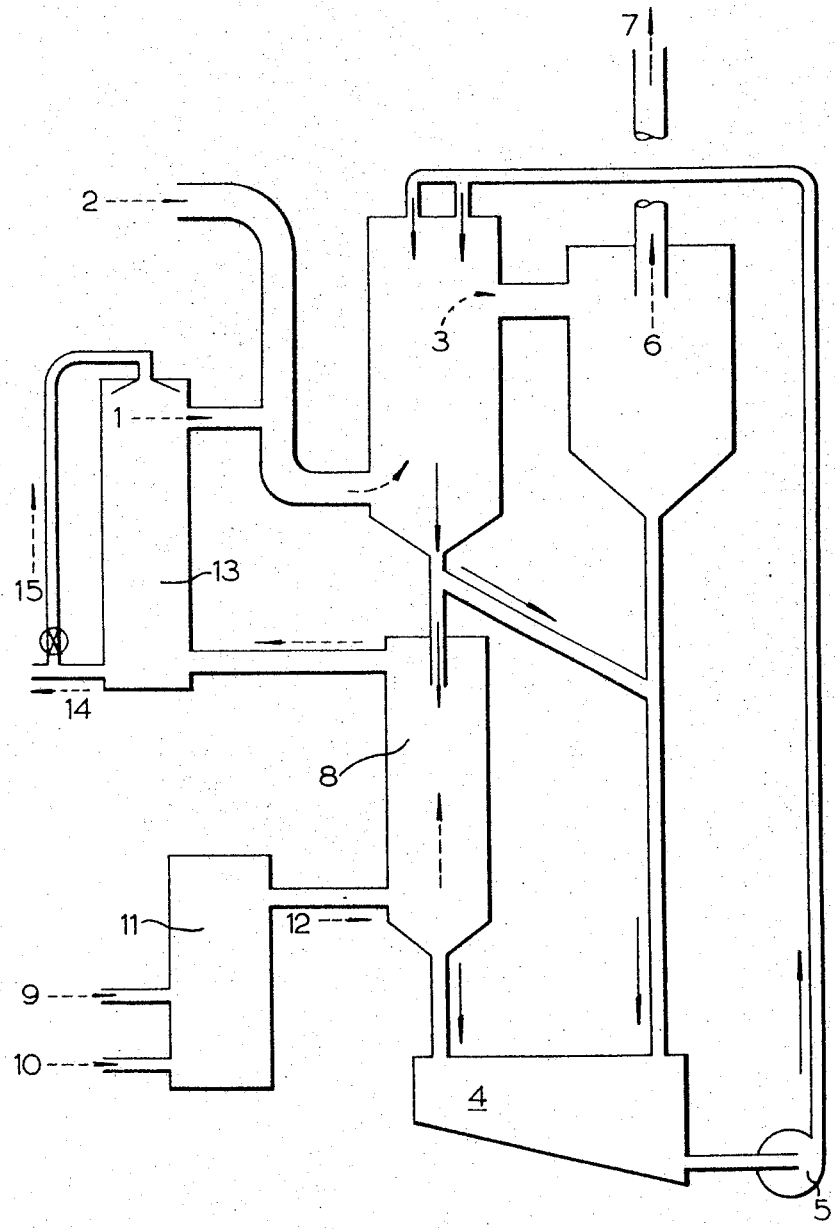
INVENTOR:
JOHN KERR
BY
Browne, Schuyler & Beveridge
ATTORNEYS

3,454,354
REMOVAL OF SULFUR DIOXIDE FROM FLUE GAS
John Kerr, Appleton, Cheshire, England, assignor to Peter Spence & Sons Limited, Widnes, England
Filed Apr. 5, 1966, Ser. No. 540,351
Claims priority, application Great Britain, Apr. 7, 1965, 14,679/65
Int. Cl. C01b *17/98, 17/16*
U.S. Cl. 23—2    6 Claims

ABSTRACT OF THE DISCLOSURE

A method for removing sulphur dioxide from flue gases by mixing with the flue gases a mixture of hydrogen sulphide and carbonyl sulphide and reacting the sulphur dioxide in the flue gas with the hydrogen sulphide and carbonyl sulphide, in the presence of a catalyst, so as to deposit on the catalyst the elemental sulphur which is formed. The catalyst is then recycled and hydrogen sulphide and carbonyl sulphide are generated from the elemental sulphur on the catalyst.

---

This invention relates to waste gas purification and is concerned particularly with reducing substantially the amount of sulphur dioxide released to the atmosphere in flue gases.

The very large tonnage of sulphur dioxide so released is a major contributing factor to the problem of atmospheric pollution. The national cost, as a result of corroson of metal and masonry structures and the deleterious effect on health, is formidable. Crops also are adversely affected.

The removal, or at least the reduction, of the sulphur content of certain fuels is technically feasible, but adds significantly to their cost. However, some reduction in sulphur content of fuels is carried out, e.g. by the hydrodesulphurisation of light and middle petroleum distillates and also by the conversion of coal to smokeless fuel. No feasible economic process is known for the substantial reduction of the sulphur content of coal for power generating stations and other large coal burning systems.

The reduction of sulphur dioxide emitted from domestic and small industrial combustion installations is only likely to be economically feasible by pre-treatment of the fuel. Large industrial installations, e.g. power generating stations or chemical factory effluents constaining $SO_2$ (at relatively low concentrations, e.g. below 1% by weight), offer the possibility of chemical processing on a very large scale. Whilst many systems and processes have been proposed for the removal of sulphur dioxide from flue and other gases containing $SO_2$ at low concentrations, i.e. below 5% by weight $SO_2$, and in particular below 1% by weight $SO_2$, none has proved to be technically and economically feasible for large installations.

For a process to be acceptable for the removal or reduction of the sulphur dioxide content of flue gases, it must have certain characteristics. It should be capable either of eliminating sulphur dioxide completely or of reudcing it to any required level. The net cost, after allowing any credits, e.g. for sulphur or other by-product, must be within acceptable limits.

In view of the scale of the possible operations, by-products should have a potential market greater than their availability, should be capable of being stored readily and should not be expensive to transport over reasonable distances. From these considerations, sulphur is much more attractive than, e.g., sulphuric acid. Again the process should avoid expensive heating of large volumes of gas or excessive power requirements due to back-pressure in the gas system; it should not cool flue gases and thus eliminate the normal advantages of good buoyancy.

According to the present invention, sulphur dioxide is removed from flue gas or other waste gases containing not more than 5% by weight of sulphur dioxide by means of a reducing gas, the reducing gas being formed out of contact with the flue gas and thereafter mixed with the flue gas in which it reacts with the sulphur dioxide in the presence of a catalyst to form elemental sulphur.

It has been found that by effecting the reaction between the sulphur dioxide and the reducing gas in the presence of a catalyst, substantially all or any desired proportion of the sulphur dioxide may be converted to and recovered as elemental sulphur. During the reaction, the sulphur is usually deposited on the catalyst. The recovery of the elemental sulphur and the consequential regeneration of the catalyst will be described in greater detail hereinafter.

An essential requirement of the process is the availability or separate production of the reducing gas. Carbonyl sulphide alone, obtainable by reacting sulphur with carbon monoxide may be used as the reducing gas but it is preferred on economic grounds to use a mixture of carbonyl sulphide and hydrogen sulphide as the reducing gas. Such a mixture may be obtained by reacting sulphur with a mixture of carbon monoxide and hydrogen, the latter mixture being obtainable economically by steam reforming of hydrocarbons.

The reducing gas may be metered into the flue gas stream in stoichiometric proportions for the reaction with sulphur dioxide but more frequently, it is envisaged that the reducing gas will be added in less than theoretical amounts, for example 50% to 90% of the stoichiometric quantity, since 100% removal of sulphur dioxide is not always required. Furthermore, a deficiency of reducing gas permits the normal variation of sulphur dioxide content in the flue gas as a result of changes in the boiler operating conditions, without any risk of certain constituents of the reducing gas, for example hydrogen sulphide, reaching the stack.

The mixture of flue gas and reducing gas is then usually contacted with a catalyst suitable for the sulphur dioxide reduction in a system producing the minimum pressure drop. In the presence of a suitable catalyst, the reduction of the sulphur dioxide will take place over a wide range of conditions, for example from above the dew point of the flue gas, frequently of the order of 50° C. up to 300° C. or more. However, the normal tail gas range of 100° C. to 150° C. is convenient and suitable, since equipment is simplified and sulphur losses are kept at a very low level. In the presence of the catalyst which depresses the sulphur vapour pressure the sulphur losses are insignificant. In the absence of catalyst, losses of the order of 8% can be expected at 100° C. and as much as 50% at 150° C.

It is envisaged that the catalyst will be re-cycled in a line contacting system, in a falling curtain, fluidised bed or other arrangement in which power requirements are economically acceptable. It is also envisaged that recycling will continue until sufficient sulphur is absorbed by the catalyst to cause a reduction in activity. It is further envisaged that a portion of the catalyst in the main cycle system will be withdrawn continuously, regenerated and returned to the main system.

The regeneration of the catalyst, i.e. the removal of the sulphur is preferably combined with generation of carbonyl sulphide or a mixture of hydrogen sulphide and carbonyl sulphide as the reducing gas.

In broad terms, regeneration requires the heating of the sulphur-containing catalyst to a temperature preferably above the boiling point of sulphur, i.e. 445° C. and in the presence of a relatively inert gas which may be used to carry away the sulphur released as vapour from the catalyst. The sulphur released may be substantially removed from the gas stream by cooling.

Ideally, the catalyst should be regenerated using an essentially inert gas. Production of a truly inert gas would add undesirably to the cost of the process but it is permissible to use a gas which is only relatively inert compared for example with air. Thus the flue gas itself could on economic grounds be used as the inert gas, particularly if recycling of the gases in the regenerating process were arranged, despite the fact that the original oxygen content of the flu gas would result in some re-oxidation of the sulphur to sulphur dioxide. However, it is preferred that a reducing gas is used as the inert gas. This reducing gas may be the gas used for the reduction of the sulphur dioxide e.g. hydrogen sulphide and carbonyl sulphide, and/or a reducing gas, such as hydrogen and carbon monoxide, used for generating, by reaction with sulphur, the gas used for the reduction of the sulphur dioxide.

In a preferred form of the invention therefore, a part of the sulphur in the catalyst to be regenerated is reacted with a mixture of hydrogen and carbon monoxide to form a mixture of hydrogen sulphide and carbonyl sulphide and the mixture of hydrogen sulphide and carbonyl sulphide formed is mixed with the flue gas for reaction with the sulphur dioxide therein to form more sulphur.

In particular, it is envisaged that a considerable saving in capital and operating costs may be achieved by disposing the catalyst to be regenerated in a container, such as a vertical shaft kiln, through which the mass of catalyst slowly moves downwards, and passing up through this kiln the limited amount of hydrogen and carbon monoxide required to convert part of the sulphur to the gas for reducing the sulphur dioxide in the flue gas. The excess of sulphur may be boiled-off as mentioned above and swept from the container by the mixture of hydrogen sulphide and carbonyl sulphide formed in the container. These gases may then pass through a liquid sulphur scrubber, an electrostatic precipitator or other arrangement for separating and recovering the elemental sulphur, the gases remaining passing into the flue gas stream prior to the zone in which they reduce the sulphur dioxide.

Continuous operation of the process is particularly desirable for economic reasons. Thus means may be provided to transfer spent catalyst continuously from the reaction zone, in which the sulphur dioxide in the flue gas is reduced, to the catalyst regeneration zone, and to transfer regenerated catalyst continuously from the catalyst regeneration zone back to the sulphur dioxide reaction zone.

Generating the reducing gas for the sulphur dioxide reaction zone in the catalyst regeneration zone dispenses with the need for the special preparation of an inert gas and the need for separate equipment for the production of the reducing gas. There is also a further advantage in this combined system of gas generation and catalyst regeneration in that the elemental sulphur is disposed over a large catalytic surface, an ideal situation for reacting the sulphur with hydrogen or hydrogen and carbon monoxide. Moreover, there is a running cost advantage in that hot gases from the steam reforming of hydrocarbons may be utilised not only to provide hydrogen and carbon monoxide for the catalyst regeneration zone but also to provide at least part of the heat required for the reaction of sulphur with these reducing gases and for the boiling-off of the excess sulphur. The operating advantage here is that if the mixture of hydrogen and carbon monoxide can be used directly, then the gases from the steam hydrocarbon reformer need not be cooled, nor need they be reacted over traditional iron oxide shift conversion catalyst in order to react carbon monoxide with steam to produce further hydrogen and carbon dioxide.

In addition to the mixture of hydrogen and carbon monoxide from the steam hydrocarbon reformer, there is a considerable amount of excess steam from the reformer. An activated alumina catalyst used in the combined catalyst regenerator and reducing gas generator does show some activity for shift conversion and part of the carbon monoxide will react with the steam present to give hydrogen which will further react with sulphur to give hydrogen sulphide.

Many catalysts are suitable for the sulphur dioxide reduction reaction. Bauxite, active aluminas, active titania, mixtures of iron and aluminium oxides, zeolites, firebrick and many other suitable materials have been described in the literature. In particular, it has been found that very high conversion efficiency and rates, despite the very low sulphur dioxide concentrations which are characteristic of the present process, may be achieved using a relatively high surface area activated alumina of good stability in the presence of water vapour. It would appear to be a necessary criterion that the catalyst should be capable of absorbing sulphur in order to discourage sulphur loss by volatilisation. Whatever the catalyst, good mechanical strength is highly desirable if unacceptable losses due to attrition are to be avoided.

The invention will now be more particularly described with reference to the accompanying drawing which is a schematic representation of a typical system capable of continuous operation:

Referring to the drawing, a mixture of hydrogen sulphide and carbonyl sulphide 1 is injected continuously into a stream of flue gas 2 at 125° C. to 150° C. in slightly less than the stoichiometric quantity required to react with the sulphur dioxide in the flue gas and the resultant gas mixture passed through a reactor system 3 containing an activated alumina catalyst. Here reduction of the sulphur dioxide occurs and elemental sulphur is deposited on the catalyst whilst part or all of any excess of sulphur dioxide in the gases is absorbed on the catalyst.

The catalyst is continuously circulated from a catalyst storage unit 4 by pump or elevator means 5, through the reactor system and back to the storage unit. Part of the catalyst from the reactor system is returned directly to the storage unit while the remainder is returned to the storage unit via a catalyst recovery cyclone 6 or disengaging zone should this be necessary. The flue gases are taken out of the catalyst system at 7 and conveyed to the chimney stack. If electrostatic precipitators are used for fly-ash control, these may be situated between the catalyst system and the stack or alternatively prior to the catalyst system.

A portion of the catalyst is removed from the reactor system and passed to a catalyst regenerator 8 from which regenerated catalyst is returned via a control valve to the catalyst storage unit 4.

Steam 9 and naptha 10 are reacted in a hydrocarbon reformer 11 to give a mixture of hydrogen, carbon monoxide and residual steam 12 which is passed through the catalyst regenerator 8 in countercurrent to the catalyst and reacts with the sulphur in the catalyst to give a mixure of hydrogen sulphide and carbonyl sulphide. The gases from the steam reformer are at a temperature sufficiently high for this reaction to occur and for the unreacted sulphur to be vaporised e.g. 450° to 550° C. All the gases in the catalyst regenerator serve as the relatively inert gas in the presence of which the sulphur is vaporised.

The gases and vapours leaving the catalyst regenerator ascend a scrubbing tower 13, the temperature conditions being such that the sulphur vapour is condensed and is withdrawn from the base of the tower at 14 as molten sulphur while the scrubbed gases 1 are injected into the main flue gas stream prior to the reactor system.

Part of the molten sulphur withdrawn from the base of the scrubbing tower is withdrawn to storage. The remainder of the molten sulphur 15 provides the scrubbing liquid for the tower.

In place of the scrubber shown in the drawing, an electrostatic precipitator or other means for precipitating sulphur from the gases may be used.

I claim:
1. In a method of removing sulphur dioxide from flue gas containing less than 5% by weight of sulphur dioxide, the steps of generating a mixture of hydrogen sulphide and carbonyl sulphide in a first zone, mixing the mixture of hydrogen sulphide and carbonyl sulphide with said flue gas, contacting the resultant mixture in a second zone with a catalyst for reacting said sulphur dioxide in the flue gas with said hydrogen sulphide and carbonyl sulphide to deposit elemental sulphur on the catalyst and recycling catalyst between the first zone and the second zone, the hydrogen sulphide and carbonyl sulphide being generated in the first zone from the sulphur on the catalyst.

2. A method as claimed in claim 1 in which the hydrogen sulphide and carbonyl sulphide are generated by the step of supplying a mixture of hydrogen and carbon monoxide to the first zone to react with the sulphur on the catalyst.

3. A method as claimed in claim 1 in which the mixture of hydrogen sulphide and carbonyl sulphide is mixed with the flue gas in an amount of from 50% to 90% of the stoichiometric quantity for reaction with the sulphur dioxide in the flue gas.

4. A method as claimed in claim 1 in which the reaction of the sulphur dioxide with hydrogen sulphide and carbonyl sulphide takes place at a temperature from 100° C. to 150° C.

5. A continuous process for removing sulphur dioxide from flue gases containing less than 1% by weight of sulphur dioxide which comprises the steps of:
  (a) reacting a hydrocarbon with steam in a hydrocarbon reforming zone to provide a mixture of hydrogen and carbon monoxide,
  (b) reacting the mixture of hydrogen and carbon monoxide with sulphur in a catalyst regeneration zone to form a mixture of hydrogen sulphide, carbonyl sulphide and sulphur vapour,
  (c) removing sulphur from the mixture of hydrogen sulphide, carbonyl sulphide and sulphur vapour,
  (d) injecting the resultant mixture of hydrogen sulphide and carbonyl sulphide into a flue gas stream,
  (e) passing the flue gas stream containing said sulphides to a reaction zone containing an activated alumina catalyst.
  (f) reacting said sulphides with the sulphur dioxide in the flue gas to deposit sulphur on said catalyst,
  (g) separating said flue gas from said catalyst,
  (h) passing said catalyst to said catalyst regeneration zone for said reaction in step (b), and
  (i) returning regenerated catalyst from the catalyst regeneration zone to said reaction zone.

6. A method as claimed in claim 1 which includes the further step of heating the catalyst on which elemental sulphur has deposited to drive off sulphur as sulphur vapour, thereby regenerating the catalyst.

References Cited

UNITED STATES PATENTS

| | | | |
|---|---|---|---|
| 1,773,294 | 8/1930 | Benner | 23—226 |
| 1,941,702 | 1/1934 | Maier | 23—226 |
| 1,955,722 | 4/1934 | Ahlqvist | 23—226 |
| 2,747,968 | 5/1956 | Pigache | 23—225 |

FOREIGN PATENTS 596,613   4/1960   Canada.

OSCAR R. VERTIZ, *Primary Examiner.*

G. O. PETERS, *Assistant Examiner.*

U.S. Cl. X.R.

23—225